United States Patent

Heightman

[15] 3,699,239

[45] Oct. 17, 1972

[54] TELEVISION EQUIPMENTS FOR FAULT INDICATION

[72] Inventor: Anthony Norman Heightman, Chelmsford, England

[73] Assignee: The Marconi Company Limited, London, England

[22] Filed: July 15, 1970

[21] Appl. No.: 55,145

[30] Foreign Application Priority Data

Aug. 7, 1969 Great Britain..........39,588/69

[52] U.S. Cl.........................178/5.4 TE, 178/DIG. 4

[51] Int. Cl...............................................H04n 9/08

[58] Field of Search...178/5.4 T, 5.4, 6 TT; 179/175, 179/2 C; 324/121, 57 R, 73 R; 340/147 SC

[56] References Cited

UNITED STATES PATENTS

| | | | |
|---|---|---|---|
| 2,878,450 | 3/1959 | Rabier | 324/73 |
| 2,855,515 | 10/1958 | Bernard | 178/5.4 T |
| 3,248,650 | 4/1966 | Bialkowski | 324/121 |

*Primary Examiner*—Richard Murray
*Assistant Examiner*—Donald E. Stout
*Attorney*—Baldwin, Wight & Brown

[57] ABSTRACT

A television equipment consisting of a number of sub units includes fault indicating and locating apparatus. The fault indicating and locating apparatus comprises a display device having raster scanning in synchronism with the television equipment scanning raster and predetermined signals are applied to different equipment sub-units for different fractions of the television raster line, and field, periods. Signals that have been passed through different combinations of sub-units are applied to sub areas of the display device, each sub area of the display device representing a different sub-unit.

18 Claims, 4 Drawing Figures

INVENTOR
Anthony Norman Heightman
BY
Baldwin Wight Diller & Brown
ATTORNEYS

INVENTOR
Anthony Norman Heightman
BY
Baldwin Wight Diller & Brown
ATTORNEYS

INVENTOR
Anthony Norman Heightman
BY
Baldwin Wight Diller & Brown
ATTORNEYS

TELEVISION EQUIPMENTS FOR FAULT INDICATION

This invention relates to television equipments and, although not limited to its application thereto, is very advantageously applicable to color television studio equipments.

It is of obvious and great importance that interruptions of serviceability of a television equipment shall be as short as possible and this requirement involves that, if an apparatus failure or fault producing partial or total unserviceability occurs, the particular section of apparatus in which the fault has occurred shall be located as rapidly as possible. Because of the complexity of modern television equipments, and especially of modern color television studio equipments, this requirements is very difficult to satisfy. Thus, for example, a typical modern color television studio equipment will include, in the camera unit, three (or four) television pick-up tubes ("red" "green" and "blue" tubes or "red" "green" "blue" and "luminance" tubes), with three, (or four), associated amplifying and signal processing channels, a camera control unit with three (or four) signal channels, a multi-core cable providing necessary connections between the camera unit and the camera control unit, and several operating potential supplies providing operating power at a number of points in the camera unit and in the camera control unit. A fault in any section of such an installation, or in any of the voltage supplies, may result in unserviceability which will remain until the faulty section is identified and the fault eliminated and it will be apparent that the more complex the installation the more difficult it normally is and the longer it normally takes to identify a comparative small section in which the fault is present.

The present invention seeks to provide an improved television equipment (and especially an improved color television studio equipment) incorporating fault indicating and locating apparatus having a display device the area of display of which is made up of a number of differently positioned sub-areas the fault indicating and locating apparatus being such that sections of the television equipment in which faults may have developed can be identified merely by noting the different sub-area or sub-areas in which consequent predetermined changes of display occur. It will be seen that the carrying out of the invention involves the division of the television equipment, at any rate notionally and for the purposes of fault location, into relatively small portions, so that the different portions in which faults may have occurred can be identified from the display. Such portions will, for convenience, hereinafter be referred to as "equipment sub-units." The term as hereinafter employed is intended to be understood in a wide sense to include any device or piece of apparatus or circuit or combination thereof which can be identified, by the fault indicating and locating apparatus of this invention, if a fault occurs therein. An "equipment sub-unit" within the meaning of that term as herein employed, may or may not be a sub-unit in the sense of being a more or less complete sub-assembly of parts. An equipment sub-unit, within the meaning of the term as herein employed, might be, for example, a camera pick up tube, or a video amplifying stage, or one or more of several power supplies, or even merely one or more wires in a multiwire cable - the so-called camera cable - ordinarily employed to connect a camera unit (including, in the case of a color television equipment, all the camera tubes employed together with signal amplifying and processing stages associated therewith) with a camera control unit.

According to this invention a television equipment consisting of a plurality of equipment sub-units includes fault indicating and locating apparatus comprising a display device, means for producing in said device a television scanning raster in synchronism with the television scanning raster employed in the television equipment, means for applying predetermined signals to different equipment sub-units for different fractions of the television raster line period and for different fractions of the television raster field period and means for applying to said display device signals derived from signals which have passed through different combinations of sub-units whereby said display device is caused to produce over its display area a display which is divided into sub-areas which are differently positioned in the display area and each of which is appropriate to a different sub-unit.

Preferably the display device is the normally provided television monitor display device of the equipment.

Preferably the sub-areas include a sub-area or areas appropriate to the pick-up camera tube or tubes included in the equipment. In this case, preferably, means are provided for blanking said camera tube or tubes and the aforesaid predetermined signals are then applied to said tube or tubes as unblanking signals.

Again preferably the sub-area or areas include a sub-area or areas appropriate to a power supply circuit or circuits for the television equipment. In this case predetermined signals for use in effecting indication of fault in said power supply circuit or circuits are preferably applied by means including a comparator or comparators comparing voltage or voltages from said circuit or circuits with a reference voltage or voltages and controlling a gate or gates through which said signals are applied.

The aforesaid predetermined signals may be rectangular pulses. This is, however, not essential and, in a color television equipment, the predetermined signals applied to sub-units other than camera tubes may be saw-tooth pulses or rectangular pulses with color sub-carrier signals superimposed thereon or interrupted rectangular pulses.

The predetermined signals may be derived from one or more pulse generators synchronized by television signals. They may include predetermined signals derived from synchronizing signals separated from television signals.

Preferably, in the case of a color television equipment, means are provided for blanking the pickup camera tubes and for then applying thereto predetermined signals acting an unblanking signals, predetermined signals of predetermined relative timing being applied at points between sub-units in the normally provided video signal processing and amplifying chains following said camera tubes, and output signals taken from one or more points in the signal channels including said tubes and chains being fed to a combiner which provides output signals for the display device. The signals fed to said combiner may be taken from the outputs of the tubes and the outputs of the last sub-units (one in each channel) of said chains but the signals fed to the combiner may also include signals taken from intermediate points between sub-units in said chains.

Switch means, operable at will, may be provided for ensuring that the predetermined signals applied at the inputs to sub-units other than pick-up camera tubes are, when said signals are so applied, the only signals thus applied but, if desired, the switch means may be such that said predetermined signals can, at will, be superimposed at said inputs upon video signals derived by the said tubes. In the latter case means may be provided for attenuating the said predetermined signals and/or the said video signals to prevent overloading by the combined superimposed signals. Such attenuating means may be automatically controlled in dependence on the level of the combined superimposed signals by level-responsive means known per se.

The invention is illustrated in and further explained in connection with the accompanying drawings in which.

Before describing in detail the studio installation which is shown, so far as is necessary to an understanding of the present invention, in the diagrammatic representation of FIG. 1, the method of operation of that installation will first be described in general terms. In order to simplify the drawings and the following description it will be assumed that the installation includes a camera of the three tube type, i.e., with "red" "blue" and "green" tubes only although, as will be apparent later, the invention is equally applicable to an installation including a camera of the well known 4-tube type, i.e., a camera with three component color tubes and a "luminance" tube.

Figure 1:
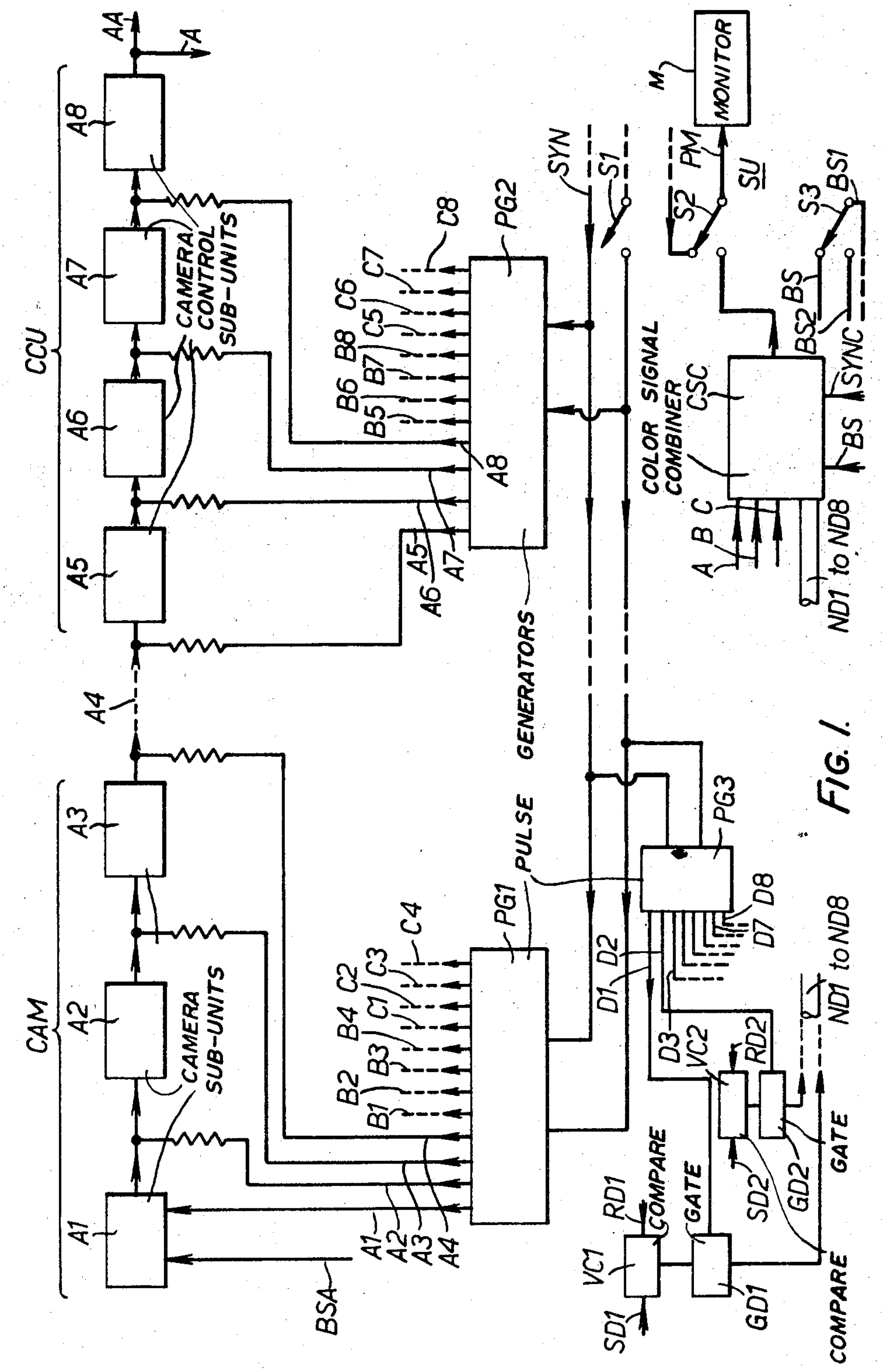
FIG. 1 is a simplified diagram showing part of a color television equipment incorporating one form of fault indicating and locating apparatus in accordance with the invention.

It will be seen on reference to FIG. 1, that there is provided a ganged two-position switch unit SU incorporating three ganged switches S1, S2 and S3. In one of the two positions — that shown — of this switch unit the normally provided television monitor M is used as in the ordinary well known way to display television pictures from signals derived from the three color tubes. This use of the television monitor is, of course, in accordance with common well known practice and it is therefore unnecessary to explain or describe it further herein. In this position of the switch unit SU (herein termed the "normal" position) the switch S1 serves no function and is effectively out of use and the switch S2 supplies picture signals for reproduction over lead PM to the picture monitor, while switch S3 controls the distribution of signals for camera tube blanking, tube blanking signals being fed in over lead BS and out, when switch S3 is in the position shown, over lead BS1 which is branched at a point (not shown) to the blanking signal input leads of all the camera tubes — input lead BSA is the only one shown — for use in the customary well known way. When, however, the present invention is to be brought into use the normally provided monitor is employed to show whether or not there is a fault in any of a number of equipment sub-units included in the camera or in the camera control unit or in the operating potential supply means and, if so, in which of these equipment sub-units that fault is. In order to use the monitor for this purpose the switch unit SU is moved over into its other position which will herein be termed the "fault location" position.

Figure 2:
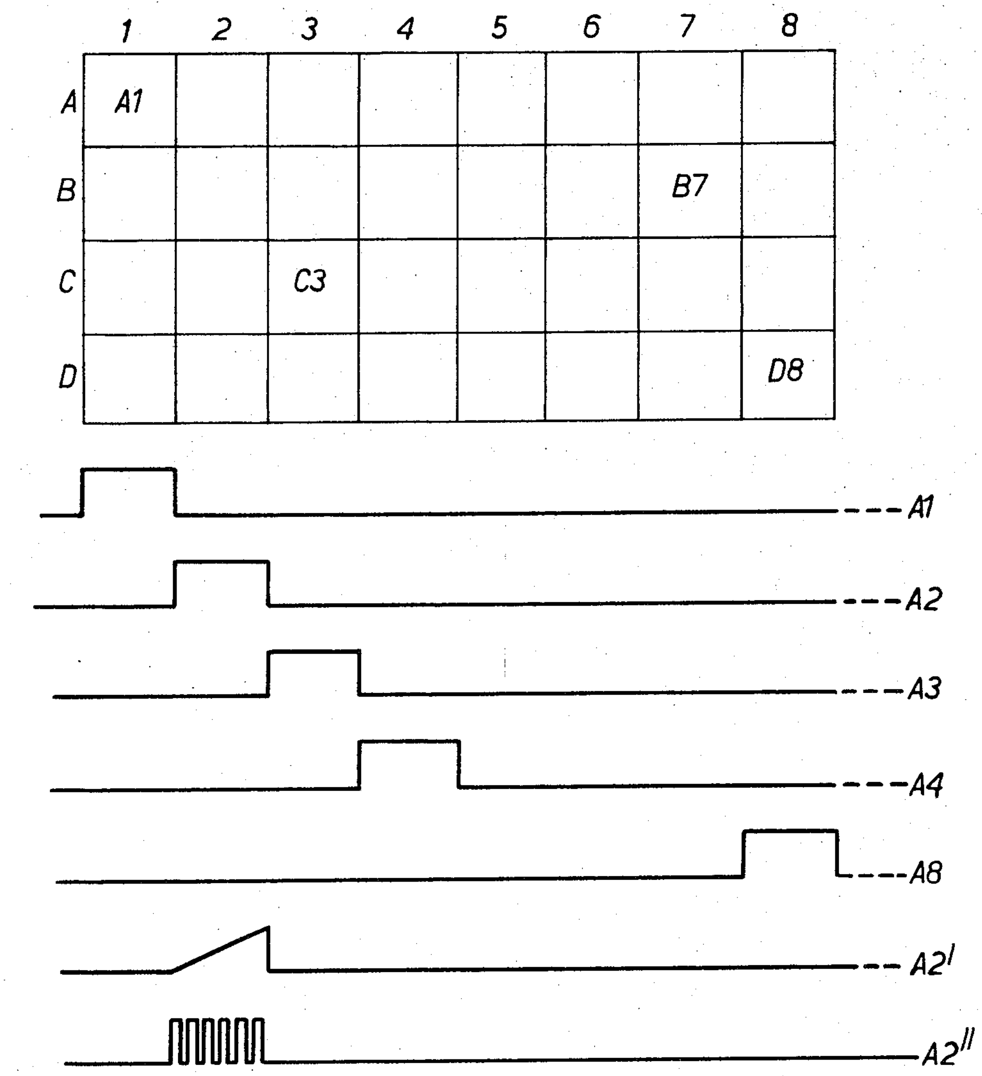
FIG. 2 is a set of explanatory diagrams representing one form of display obtainable from a display device, together with explanatory wave forms.

When the switch unit SU is moved into the fault location position, the monitor gives a display indication which indicates in which (if any) of 32 equipment sub-units there is a fault. These 32 sub-units comprise, in the particular embodiment now being described, nine sub-units in the camera unit - three in each of the three component color channels thereof; three in the camera cable connecting the camera unit to the camera control unit (one in each channel); twelve in the camera control unit, (four in each of the three component color channels thereof); and eight operating potential supply sub-units. The identification of the particular sub-units in which there is a fault is determined by noting the position or positions in the monitor display in which a fault indication appears. For this purpose the effective area of the display screen of the monitor may be regarded, as represented diagrammatically in the upper part of FIG. 2, as divided by imaginary vertical and horizontal lines into 32 sub-areas, eight in a row and four in a column. For identification purposes the columns are numbered 1 to 8 and the rows are lettered A to D so that any sub-area can be identified by the row and column in which it occurs, e.g., the sub-area at the bottom right hand corner of FIG. 2 is identifiable as sub-area D8. Each sub-area is appropriated to a different one of the 32 equipment sub-units above mentioned in the sense that, if a fault occurs in any such sub-unit an indication thereof will appear in the sub-area approriated thereto (and in most cases, in other sub-areas as well). It is convenient, for purposes of explanation, to apply to the 32 equipment sub-units the same identifying references as are used for the sub-areas. Although, as will be obvious, any of a wide variety of arrangements can be adopted, in the particular installation now being described, all equipment sub-units having a reference containing the letter A are in a "green" signal channel; all sub-units with a reference containing the letter B are in a " red" signal channel; all subunits with a reference containing the letter C are in a "blue" signal channel; and all sub-units with a reference containing the letter D are operating potential supply sub-units. Sub-units A1 to A3, B1 to B3 and C1 to C3 inclusive are in the camera unit, which is indicated as a whole by the bracket CAM in FIG. 1; and sub-units A5 to A8, B5 to B8 and C5 to C8 inclusive are in the camera control unit which is indicated by the bracket CCU in FIG. 1. The units CAM and CCU are, of course, in use linked as in the customary way by a flexible multi-core so-called camera cable which plugs into the camera unit at one end and the camera control unit at the other and different color channel portions of this cable constitute the sub-units A4, B4 and C4. In FIG. 1, for simplicity, only the "green" color channel and associated apparatus is shown, the arrangement of the "red" and "blue" channels and their associated apparatus being similar. The equipment subunits in FIG. 1 are identified by letter-number references as above described. Thus the "green" pickup (camera) tube is sub-unit A1 and it is followed in the camera unit by signal amplifying the processing sub-units which are indicated by the blocks A2 and A3 and are as known per se; A4 is the "green" channel part of the camera cable (not otherwise shown); and blocks A5 to A8 inclusive are successive equipment sub-units in the camera control unit CCU. "Green" signals are available on the output leads A and AA of the last sub-unit A8 and those on the lead A are taken to the similarly referenced input of a color signal combiner CSC constituted for example by a signal adding resistive network preceded, in the input leads thereto, by suitable isolating means, for example high resistances. The other inputs to this combiner comprise inputs B and C which are fed respectively with "red" signals and "-blue" signals from leads, corresponding to lead A, at the output ends of the sub-units B8 and C8 respectively (not shown); and eight other inputs which are utilized, as will be explained later, to cause the monitor display to show, in the event of a supply potential failure, in which one of eight potential supplies failure has occurred. In order to simplify the drawing these eight other inputs are represented in FIG. 1 by a single lead referenced "ND1 to ND8." The output from the combiner CSC is, when switch unit SU is in its fault location position, fed through switch S2 to the picture monitor (not shown).

When the switch unit is in its fault locating position, the required special tube blanking is applied to all three color tubes via switch S3. This special blanking is such as to blank off the tubes when unblanked by pulses supplied from the pulse generator PG1 over leads A1, B1 & C1. These special blanking pulses are supplied over lead BS2 and thence via lead BS1 to the lead BSA and the corresponding leads in the other tubes. The effect of this special blanking, considered alone, is therefore to suppress the normal picture signals. However, means, now to be described, are provided for unblanking these tubes at and for appropriate times and periods.

When the switch S1 is in its position other than that shown, an energizing or actuating potential is applied to three pulse generators PG1, PG2 and PG3. These pulse generators are synchronized by synchronizing signals fed in on lead SYN and obtained from any convenient already provided synchronizing signal source (not shown) in the television equipment.

Each of the two pulse generators PG1 and PG2 has twelve outputs. Generator PG1 produces on the leads marked A1, A2, A3, A4 pulses which are timed as shown in the similarly referenced lines A1, A2, A3 and A4 respectively, in the lower part of FIG. 2 each pulse being one eighth or preferably a little less than one eighth of a television line long. The leads A2 to A4 (like all the other pulse injecting leads to be mentioned later) should contain suitable isolating means which are exemplified in FIG. 1 by high resistances shown in the leads A2 to A4 and A5 to A8 (to be referred to later). The pulses A1 timed in the lines as above set forth, are unblanking pulses for the tube A1. They are repeated at line frequency and each appears during a quarter of, or preferably a little less than one quarter, of an effective field period of the television system. Thus the unblanking pulses A1 unblank the green pick-up tube A1 so that this tube will provide, during the time in which the sub-area A1 is scanned, "green" output signals corresponding to the green component in the scene being viewed by the camera unit CAM. The pulses A2 are applied as input pulses to the equipment sub-unit A2. They correspond with the pulses A1 except that they are so timed as to appear during the time in which the sub-area A2 is scanned; similarly the pulses A3 are applied as input to the sub-unit A3 and appear while sub-area A3 is scanned; and similarly again the pulses A4 are applied as input to the camera cable portion A4 (this is regarded, for purposes of the present invention, as another equipment sub-unit) and appear while sub-area A4 is scanned.

Generator PG2 also has twelve outputs of which four consist of pulses A5 to A8 inclusive appearing on the leads similarly referenced. The pulses A5, A6, A7 and A8 which are rectangular pulses like the pulses A1 to A4, are timed to appear during the periods in which the sub-areas A5, A6, A7 and A8 respectively are scanned.

The means for timing the various pulses form per se no part of this invention and since there are several ways, known per se, in which such timing may be effected, it is unnecessary to describe such timing means in detail herein.

The four pulse outputs on the leads B1 to B4 respectively of the generator PG1 are like those already described and perform functions corresponding to those performed by the pulses A1 to A4 respectively. Thus, while sub-area B1 is being scanned, the red pick-up tube B4 (not shown) is unblanked and while sub-areas B2, B3 and B4 are being scanned pulses B2, B3 and B4 respectively are applied to the inputs of sub-units B2, B3 and B4 (not shown) respectively. Similarly the last four output leads C1, C2, C3 and C4 of generator PG1 provide outputs which unblank the tube C1 (not shown) during the scanning of sub-area C1 and constitute inputs to the sub-units C2, C3 and C4 respectively, during scanning of the sub-areas C2, C3 and C4 respectively. The remaining eight output leads B5 to B8 and C5 to C8 of generator PG2 provide, during the scanning of sub-areas B5 to B8 and C5 to C8 respectively, pulses which are applied to the inputs of equipment sub-units B5 to B8 and C5 to C8 respectively (not shown). As a further example the pulse waveform provided at lead A8 is shown by line A8 of FIG. 2.

Consider the operation of the apparatus as so far described and, for the purposes of this consideration, assume there is no fault in any part of the potential supply equipment. The, if there is no fault anywhere else, a portion of the scene "viewed" by the camera will appear in the sub-areas A1, B1 and C1 and all the other areas will appear uniformly illuminated. If now there is a failure of tube B1, for example, the portion of the picture previously in sub-area B1 will (if there is complete failure) disappear and a partial or intermittent failure will produce a corresponding resultant change in the picture portion previously in sub-area B1. A fault causing a change in signal level at, say, the output of sub-unit A3 will produce a reduction of illumination of sub-area A4 and also of the sub-areas A1, A2 and A3 since output signals from the units A1, A2 and A3 must also pass through A4. If, however, the fault is in A6 so that it is such as to cause a change in level at the output of A6, there will be a reduction of illumination of sub-area A6 and also in the sub-areas A1 to A5 inclusive. Thus any fault in any of the sub-units A1 to A8, B1 to B8 and C1 to C8 will produce, in the monitor, a different display which, by observing the combination of the sub-areas A1 to A8, B1 to B8 and C1 to C8 in which changes occur, indicate to the observer the particular equipment sub-unit in which a fault is present. Also the nature of the changes seen will give some information as to the type of fault. Thus, for example a complete loss of signal in an equipment sub-unit may cause the appropriate sub-areas to become black; an intermittent type of failure may produce flickering; and a fault producing an incomplete loss of amplitude may result in a shade of grey.

As previously stated, the various pulse outputs are preferably of slightly less individual duration than that corresponding to the widths of the sub-area to which they are appropriate and occur during a fraction of a field period slightly less than the fraction corresponding to the height of the sub-area in question. If this is done each sub-area appearing on the monitor will be separated from its neighbours by thin black spacings, the result being as though the lines appearing in the upper part of FIG. 2 were thickened to narrow strips. This is of some advantage in that it separates the sub-areas more clearly and makes inspection and interpretation of the fault locating display somewhat easier.

Pulse generator PG3 is employed in connection with the identifying display of faults in the potential supply equipment sub-units of which, in the present example, there are eight. These sub-units are not themselves shown in FIG. 1 but are represented merely be their supply leads on which the respective potentials appear. So as to avoid undue complication of the drawing only two, SD1 and SD2, of the eight supply leads are shown. The circuit arrangements in connection with the other six are similar. Pulse generator PG3, like the generators PG1 and PG2 has eight outputs each providing one pulse per television line, the pulses being so timed and occurring over a fraction of the field period so chosen that the pulses D1, on output lead D1, occur when sub-area D1 of the monitor display is being scanned; pulses D2, on output lead D2, occur when sub-area D2 is being scanned . . . and so on. The way in which the pulses D1 to D8 are used is similar in all cases and accordingly description of the utilization of pulses D1 will suffice.

Associated with each potential supply sub-unit is a voltage comparator such as VC1, having one input SD1 from the sub-unit in question and the other RD1 from a reference potential source (not shown) of voltage equal to that intended to be supplied from the said sub-unit. So long as there is no fault the pulses D1 from the generator PG3 are fed through a normally open gate GD1 to provide the input ND1 (one of the eight inputs carried in the cable referenced "ND1 to ND8" in FIG. 1) to the combiner CSC, but if the voltage input on the lead SD1 to the comparator VC1 departs by more than a predetermined amount from the reference voltage input from RD1, there occurs from the comparator VC1 an output which closes the gate GD1. While the pulses ND1 are being passed to the combiner CSC illumination of the appropriate sub-area (D1) will occur but if the gate GD1 closes so that the pulses are cut off, this sub-area will go black. Similar indications of faults on any of the other supply sub-unit leads SD2 to SD8 are given in the corresponding sub-areas D2 to D8. If desired the illustrated arrangement could be modified so as to give different kinds of indications for different natures of fault. Thus it might be desirable to indicate excessively high potential by one type of indication and excessively low potential by another. This could be achieved in various different ways, e.g., by designing comparators VC1, VC2 . . . VC8 each to give an output of one polarity if the input voltage thereto is excessively low and an output of opposite polarity if said voltage is excessively high; using said one polarity output to close the associated gate GD1, GD2 . . . GD8 (as already described); and using said other polarity output to actuate a subsidiary pulse generator (not shown) to provide pulses to close the associated gate GD1, GD2 . . . GD8 intermittently. If this were done the appropriate sub-area D1, D2 . . . D8, would go black in response to a low voltage fault and would flash intermittently in response to a high voltage fault.

In FIG. 1 separate pulse generators PG1 and PG2 are provided for use in connection with the indication of faults in the camera unit CAM and in the camera control unit CCU although, obviously, the functions of these two generators could be combined in a single pulse generator having twice the number of appropriately timed outputs and situated either on the camera unit side of the cable A4 or on the camera control unit side of said cable. If, however, fault indication in both these units is required, the use of a single generator would involve including in the cable A4 enough conductors to carry some of the pulses to where they are required. Similarly, in FIG. 1, a single pulse generator PG3, at the camera unit end of the cable, is shown but if desired this could be replaced by two generators, one having pulse outputs necessary to provide indication of faults in the supplies to the camera unit and the other having pulse outputs necessary to provide indication of faults in the supplies to the camera control unit.

The combiner CSC could take any of a variety of different forms, one preferred form being that of an adding arrangement having resistive networks for adding inputs and, following the same, an output amplifier adapted to feed a standard television coaxial cable at standard voltage level for connection to the monitor. Obviously, in order that the monitor shall operate properly, the combiner CSC should include means for adding to the signal fed to its output terminals standard television synchronizing pulses (these are supplied from any convenient source over lead BS in FIG. 1) for blanking out spurious signals.

The pulse generators PG1, PG2 and PG3 could be arranged to provide sawtooth pulses, e.g., as shown at A2′ in FIG. 2 instead of rectangular pulses as shown at A2 of that figure for all the pulse outputs except those used to unblank camera pick-up tubes. If this is done sub-areas which, when rectangular pulses are used, appear (in the absence of faults) uniformly illuminated will appear shaded. This would have the advantage that the display would give additional information as to the states of the equipment sub-units because such a sawtooth wave in effect explores the amplitude characteristics of elements in the signal path and serious deterioration of such elements would manifest themselves as noticeable changes in shading. Again, in place of either rectangular or sawtooth pulses, interrupted pulses as shown at A2'' of FIG. 2 could be provided at all pulse generator outputs except those employed for pick-up tube unblanking. Such pulses would result in spaced vertical bars over the appropriate display sub-areas and would yield some additional information about the frequency response of elements in the signal path.

In the particular arrangement illustrated in FIG. 1 a portion of the scene viewed by the camera appears in sub-areas A1, B1 and C1. Obviously by suitably timing the pulses from the pulse generators these "scene" portions could be made to appear in any other sub-areas desired, e.g., more centrally in the monitor screen: indeed the selection of the location of the sub-areas appropriate to different sub-units of the equipment is entirely arbitrary and, by suitable pulse timing, can be selected as desired. Indeed a fault display occupying the whole useful are of the monitor screen is not an essential feature of the invention and, by suitable pulse timing, it is obviously possible to arrange the fault display to occupy only a fraction of said useful area — e.g., one corner quarter of it — leaving the rest available for simultaneous display of that part of the normal picture not "cut out" by the fault display.

It is common practice to provide, adjacent to the normally provided monitor, an oscilloscope for waveform examination. The output signal from the combiner CSC may be applied to such an oscilloscope to enable further useful information to be obtained, especially if pulses as typified by the lines A2' and A2'' of FIG. 2 are used.

If desired a suitably marked but otherwise transparent sheet, marked out in sub-areas with appropriate legends, may, if desired, be provided for superimposition on the fault locating display on the monitor screen.

With the apparatus as so far described a fault occurring in any equipment sub-unit in a signal path (e.g., the path extending from A1 to A8 in FIG. 1) will produce a fault indication not only in the monitor sub-area appropriate to that sub-area but also in a monitor sub-area or sub-areas appropriate to any preceding sub-unit or sub-units in that path. If this is regarded as inconvenient or undesirable, this result may be modified by providing additional signal paths to the combiner CSC. Thus, to give an example likely to arise in practice, it might be desirable so to arrange the fault indication that faults in the camera control unit or in the camera cable would not result in fault indications appearing in the monitor sub-areas appropriate to the sub-units A1, A2 and A3 of the camera unit. This could be achieved by providing an additional signal path, with suitable isolation means, leading from the output side of the sub-unit A3 direct to the combiner CSC. If this be done, a fault in A3 will produce a fault indication in sub-area A3 (and also, of course, in sub-areas A1 and A2). Similarly an added signal path between the output of A1 and the combiner CSC would result in fault indication being given in sub-area A1 only if there were a fault in the tube A1.

If desired means may be provided for enabling the normally provided camera view-finder, which is, of course, normally employed merely for displaying the camera picture (i.e., a picture built up from signals provided by the camera) to display, when required, a fault indicating display as shown by the monitor. Such means could comprise means for substituting (when required) for the normal video signal at the camera control unit, the output from the combiner. This would facilitate fault location in the camera.

Figure 3:
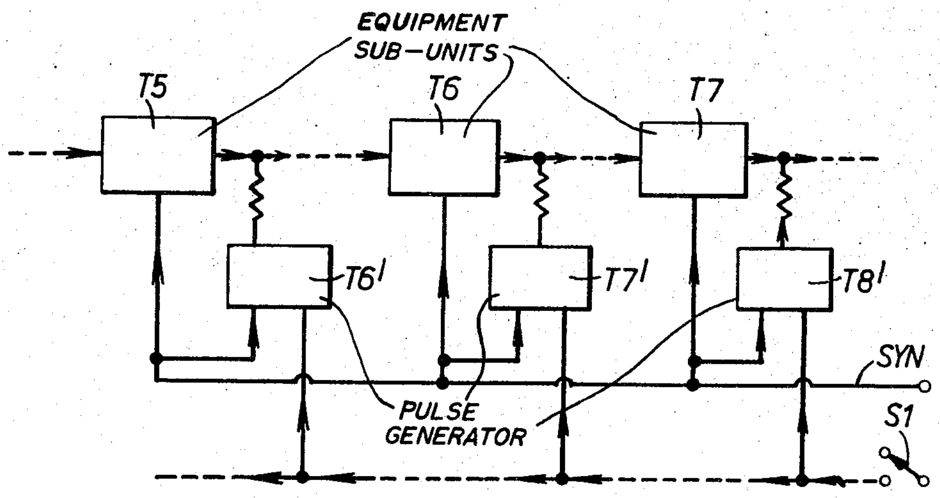
FIGS. 3 and 4 are diagrams illustrative of details and modifications.
Figure 4:
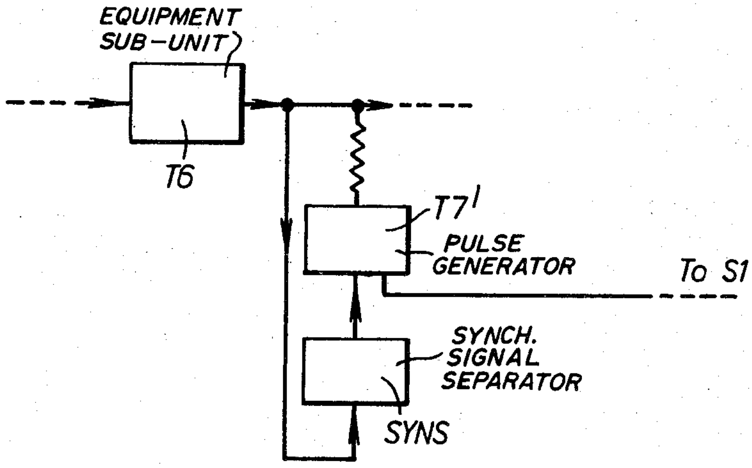

In some cases, for example in a complex television installation comprising several camera units with their associated camera control units, signal mixing equipments for mixing different television signals and signal distributing and switching arrangements leading to possibly remotely situated recording, monitoring or other devices, the distances over which the pulse outputs (or some of them) from the pulse generators may have to be transmitted, in an arrangement as so far described with reference to FIG. 1, may be long enough to give rise to difficulties because of propagation delays in pulse transmission, for, as will be appreciated, these pulses must be correctly timed in relation to one another and to the video signals at the appropriate points of pulse injection. Difficulties of this nature can be readily overcome, in cases in which they arise, by substituting for pulses from a relatively remote pulse generator, pulses from a correctly synchronized separate pulse generator close to the point (or points) of pulse injection. FIG. 3 illustrates so far as is necessary to an understanding thereof, a modification of this nature, the said figure showing diagrammatically only part of the modified embodiment. In FIG. 3 there are shown, by way of example only, three equipment sub-units in the signal path which are referenced T5, T6 and T7. They could be any sub-units in a television signal channel. The pulses applied at the three points of pulse injection shown in FIG. 3 are obtained, not as in FIG. 1 from the three outputs of a single generator, but from three separate generators, referenced T6', T7' and T8', situated near the respective points of pulse injection, to which activating signals are applied via the switch S1 (corresponding in function with the switch S1 in FIG. 1) and synchronizing signals are applied as indicated by the reference SYN. As represented in FIG. 4 these synchronizing signals may be obtained, if desired, from the video signals at the point of pulse injection. FIG. 4 shows this for only one of the sub-units and generators of FIG. 3. In FIG. 4 SYNS is a synchronizing signal separator.

In some television installations there are provided signal paths which include alternatively utilizable portions which can be switch-selected to be brought into use alternatively, as may be required, to meet different operational conditions. Obviously the invention is equally applicable to such installations. Where, in such an installation, the invention is applied in such manner as to involve pulse injection into switch selectable generally similar signal path portions, the corresponding pulsed inputs to corresponding points of injection in the two portions may be arranged to have the same timing so that the fault location display presented to the operator is not changed merely as a result of changing over the position of the path portion selecting switch. However, if preferred, the pulse inputs to the injection points to all the different sub-units in a television installation may be differently timed to permit different fault displaying sub-areas of the fault location display to be allotted to each sub-unit. Furthermore, the general form of the display, i.e., the relative location of the different sub-areas thereof, is open to wide choice by suitably choosing the timing relationships of the different injected pulse trains. Thus, for example, it is possible so to arrange the relative timings and the sub-areas of the display, that there is a significant and apparent relationship between the positions of the different sub-areas of the display and the positions, in the installation, of the different sub-units to which they are appropriate.

In large and complex installations it may be of advantage to provide means for selectively activating pulse generators, e.g., in groups, so as to enable the sub-units in different parts of the installation to be checked for faults while leaving other parts in normal operation.

In some cases the injection of pulses at pulse injection points at which video signals are present may result in some overloading of following apparatus in the signal path into which the pulses are injected. Also, in some cases of this nature, the video signals may produce a certain amount of impairment of the fault display presentation. Difficulties of this type may be overcome by providing means for interrupting the video signal path, or inserting attenuation into the said path, at a point preceding a point of pulse injection. This may be done in any of a variety of different ways, e.g., by using, for the control of circuit-interrupting or attenuation-inserting relays the activating signals employed to activate the appropriate pulse generating means. In some cases it may be desired not to use the monitor at will (as in FIG. 1) either for providing a normal picture display or a fault location indicating display, but, when required, to superimpose the fault indicating display on the normal picture display. If, in such a case, it is considered that the superimposed video signals and injected pulses could result in overloading, this can be prevented by providing means, actuated for example by pulse generator activating signals, for attenuating the video signals and/or means, actuated in dependence on signal level, for attenuating the injected pulses and/or the video signals.

Where the invention is applied to color television systems the fault location display may also be colored. This may be achieved by using, instead of simple pulses as hereinbefore described, pulses with superimposed color sub-carrier signals. Such signals may be obtained in any manner well known per se in color television practice. By using differently constituted superimposed color sub-carrier signals at different pulse injection points, different colors may be given to different sub-areas or the superimposed color sub-carrier signals may be such that, in the absence of faults, all the sub-areas are of the same color and brightness, so that certain types of distortion fault which may occur and which effect the color sub-carriers, will manifest themselves as color and shade changes in the display.

Obviously instead of directly injecting pulses as hereinbefore described, the said pulses may be used to control the injection of other signals, e.g., television test signals, at the various injection points.

I claim

1. A television equipment consisting of a plurality of equipment sub-units including fault indicating and locating apparatus comprising display, means for displaying a television scanning raster produced by the television equipment, means for applying predetermined signals to different equipment sub-units for different fractions of the television raster line period and for different fractions of the television raster field period and means for applying to said display means signals derived from signals which have passed through different combinations of sub-units whereby said display means is caused to produce a display which is divided into sub-areas which are differently positioned and each of which is appropriate to a different sub-unit.

2. An equipment as claimed in claim 1 wherein the display means is the normally provided television monitor display device of the equipment.

3. An equipment as claimed in claim 1 wherein the sub-areas include a sub-area or areas appropriate to the pick-up camera tube or tubes included in the equipment.

4. An equipment as claimed in claim 3 wherein means are provided for blanking said camera tube or tubes and the aforesaid predetermined signals are then applied to said tube or tubes as unblanking signals.

5. An equipment as claimed claim 1 wherein the sub-area or areas include a sub-area or areas appropriate to a power supply circuit or circuits for the television equipment.

6. An equipment as claimed in claim 5 wherein predetermined signals for use in effecting indication of fault in said power supply circuit or circuits are applied by means including a comparator or comparators comparing voltage or voltages from said circuit or circuits with a reference voltage or voltages and controlling a gate or gates through which said signals are applied.

7. An equipment as claimed in claim 1 wherein the predetermined signals are rectangular pulses.

8. A color television equipment in accordance with claim 1 wherein the predetermined signals applied to sub-units other than camera tubes are saw-tooth pulses or rectangular pulses with color sub-carrier signals superimposed thereon or interrupted rectangular pulses.

9. An equipment as claimed in claim 1 wherein the predetermined signals are derived from one or more pulse generators synchronized by television signals.

10. An equipment as claimed in claim 9 wherein the predetermined signals include predetermined signals derived from synchronizing signals separated from television signals.

11. A color television equipment in accordance with claim 10 wherein means are provided for blanking the pick-up camera tubes and for then applying thereto predetermined signals acting as unblanking signals, predetermined signals of predetermined relative timing being applied at points between sub-units in the normally provided video signal processing and amplifying chains following said camera tubes, and output signals taken from one or more points in the signal channels including said tubes and chains being fed to a combiner which provides output signals for the display device.

12. An equipment as claimed in claim 11 wherein the signals fed to said combiner include signals taken from the outputs of the tubes and the outputs of the last sub-units (one in each channel) of said chains.

13. An equipment as claimed in claim 11 wherein the signals fed to said combiner include signals taken from intermediate points between sub-units in said chains.

14. An equipment as claimed in claim 13 wherein means, operable at will, are provided for ensuring that the predetermined signals applied at the inputs to sub-units other than pick-up camera tubes are, when said signals are so applied, the only signals thus applied.

15. An equipment as claimed in claim 14 wherein the switch means are such that said predetermined signals can, at will, be superimposed at said inputs upon video signals derived by the said tubes.

16. An equipment as claimed in claim 15 wherein means are provided for attenuating the said predetermined signals and/or the said video signals to prevent over loading by the combined superimposed signals.

17. An equipment as claimed in claim 16 wherein said attenuating means are automatically controlled in dependence on the level of the combined superimposed signals by level-responsive means.

18. In combination with a television equipment system which comprises a plurality of sub-units, including a camera tube, having a video signal output and means for controlling said output in accord with a television scanning raster; fault indicating and locating apparatus which comprises:

display means for displaying a television scanning raster produced by said television equipment system;

means for blanking said camera tube;

means for applying predetermined signals to different ones of said sub-units while said camera tube is blanked to produce discrete video test signal outputs associated with said different sub-units for different fractions of the television raster line period and for different fractions of the television raster period; and means for connecting said separate video test signals to said display means whereby said display means produces separate displays corresponding to said discrete video test signal outputs filling different, fixed areas of the display.

* * * * *